(12) United States Patent
Holton et al.

(10) Patent No.: US 12,508,015 B2
(45) Date of Patent: Dec. 30, 2025

(54) SUTURING APPARATUS NEEDLE DRIVE

(71) Applicant: Cypris Medical, Inc., Chicago, IL (US)

(72) Inventors: Daniel B. Holton, Evanston, IL (US); Daniel E. Roush, Niles, IL (US); Scott R. Ariagno, Inverness, IL (US)

(73) Assignee: Cypris Medical, Inc., Chicago, IL (US)

( * ) Notice: Subject to any disclaimer, the term of this patent is extended or adjusted under 35 U.S.C. 154(b) by 285 days.

(21) Appl. No.: 18/133,832

(22) Filed: Apr. 12, 2023

(65) Prior Publication Data

US 2024/0341749 A1 Oct. 17, 2024

(51) Int. Cl.
*A61B 17/04* (2006.01)

(52) U.S. Cl.
CPC ...... *A61B 17/0469* (2013.01); *A61B 17/0482* (2013.01)

(58) Field of Classification Search
CPC . A61B 17/0469; A61B 17/0482; A61B 17/06; A61B 17/062; A61B 17/0625; A61B 2017/00876
See application file for complete search history.

(56) References Cited

U.S. PATENT DOCUMENTS

| | | | |
|---|---|---|---|
| 5,562,686 A | 10/1996 | Sauer et al. | |
| 8,075,573 B2 * | 12/2011 | Gambale | A61B 17/0469 606/145 |
| 10,660,637 B2 | 5/2020 | Taylor et al. | |
| 10,898,181 B2 | 1/2021 | Steege | |
| 11,103,236 B2 | 8/2021 | Taylor et al. | |
| 2010/0137888 A1 * | 6/2010 | Wulc | A61B 17/0625 606/144 |
| 2012/0022560 A1 * | 1/2012 | Ferreira | A61B 1/00087 606/145 |
| 2012/0221022 A1 | 8/2012 | Devens, Jr. et al. | |
| 2018/0263619 A1 * | 9/2018 | Steege | A61B 17/0491 |
| 2019/0307445 A1 * | 10/2019 | Taylor | A61B 17/0482 |
| 2019/0365380 A1 * | 12/2019 | Holton | A61B 17/0469 |
| 2021/0169470 A1 | 6/2021 | Steege | |
| 2021/0346010 A1 * | 11/2021 | Godek | A61B 17/0483 |

OTHER PUBLICATIONS

PCT International Patent Application No. PCT/US24/23829, International Search Report and Written Opinion of the International Searching Authority mailed Aug. 22, 2024, 10 pages.

* cited by examiner

*Primary Examiner* — Diane D Yabut
*Assistant Examiner* — Christian D Knauss
(74) *Attorney, Agent, or Firm* — James B. Conte; Craig R. Miles; CR MILES P.C.

(57) ABSTRACT

A suturing system including apparatus and methods for disposing a suture in a substrate comprising a needle configured to engage and carry a suture ferrule through the substrate to dispose the suture in the substrate between a substrate first location and a substrate second location. In particular embodiments, the suturing apparatus can include a structure to dampen excess forcible urging or absorb forcible urging applied after the needle engages a needle stop to terminating travel of the needle, and/or a magnetic drive to assist forcible urging on the needle drive or independently generate force sufficient to independently operate the needle drive or provide a combination of forces over the travel path of the needle to both assist forcible urging, and at a particular point in the travel path of the needle, independently operate the needle drive.

14 Claims, 10 Drawing Sheets

SUTURING APPARATUS NEEDLE DRIVE

I. FIELD OF THE INVENTION

In general, a suturing system includes embodiments of a suturing apparatus and a method of making and using embodiments of the suturing apparatus for disposing a suture in a substrate. Specifically, embodiments of a suturing apparatus comprising a needle drive configured to dampen excess forcible urging or absorb forcible urging applied after full extension of the needle, and in particular embodiments, including a magnetic drive to assist forcible urging on the needle drive or generate force sufficient to operate the needle drive independent of forcible urging of a user.

II. BACKGROUND OF THE INVENTION

Conventional suturing apparatuses may include a needle drive operable by forcible urging of a user on a needle drive actuator. A disadvantage in conventional needle drives may be that there is no structure to dampen excess forcible urging or absorb forcible urging applied after the needle engages a needle stop to terminate travel of the needle. The application of excess forcible urging or forcible urging applied after the needle can no longer move forward can damage the suturing apparatus and may impair placement of a suture in a substrate. Accordingly, there can be a substantial advantage in a suturing apparatus including a structure to dampen excess forcible urging or absorb forcible urging applied after the needle engages a needle stop to terminating travel of the needle.

Additionally, conventional suturing apparatuses may not include a magnetic drive to assist forcible urging of a user on the needle drive or independently generate force sufficient to independently operate the needle drive or to provide a combination of forces over the travel path of the needle to both assist forcible urging of the user, and at a particular point in the travel path of the needle, operate the needle drive independent of forcible urging by the user. There can be a disadvantage in conventional suturing apparatuses lacking independent operation of the needle drive in at least a portion of needle travel path because forcible urging on the needle drive by a user concurrent with forcible manipulation of the suturing probe by a user to properly capture a substrate and properly place a suture in the substrate can impair the accuracy in capture of the substrate and placement of the suture in the substrate.

III. SUMMARY OF THE INVENTION

Accordingly, a broad object of particular embodiments of the invention can be to provide a suturing apparatus comprising a suturing probe including a needle receiving chamber disposed adjacent a substrate capture chamber. A central tubular member can be coupled to the suturing probe, wherein the central tubular member has within a first longitudinal channel and a second longitudinal channel. A needle having a needle first end opposite a needle second end can be slidably disposed in the first longitudinal channel. A needle drive can be slidingly engaged to the central tubular member. The needle drive coupled to the needle operates to drive the needle between a retracted condition having the needle first end entirely within the first longitudinal channel and an extended condition having a needle first end within the needle receiver of the suturing probe. The needle drive can include one or more of: a compressible member receptacle having a receptacle first end having an inwardly extending first retainer ring defining a first end opening and a receptacle second end having an inwardly extending second retainer ring defining a second end opening; a tubular collar having collar first end opposite a collar second end, the collar first end having an annular shoulder, wherein the collar second end can be configured to connect to the needle second end, and wherein the tubular collar telescopingly engages the first end opening to engage the annular shoulder with the first retainer ring; a compressible member having a compressible member first end opposite a compressible member second end, wherein the compressible member first end engages the annular shoulder of the tubular collar and the compressible member second end engages the second retainer ring; and tubular drive member having a tubular drive member first end engaged to the second retainer ring of the compressible member receptacle and a tubular drive member second end, wherein the tubular drive member having a tubular drive member external surface configured to operably connect to a needle drive actuator operable to actuate the needle drive to move the needle between the retracted condition and the extended condition.

Another broad object of particular embodiments of the invention can be to provide a suturing apparatus comprising a magnetic drive operable to move the needle. In particular embodiments the magnetic drive can be coupled to the needle drive of the suturing apparatus to generate a magnetic attraction force which assists in or independently moves the needle from the retracted condition toward the extended condition, or which assists in moving the needle in a portion of the travel path of the needle and independently moves the needle in a portion of the travel path of the needle between the retracted condition to the extended condition of the needle. A particular embodiment of the magnetic drive comprises a first magnet holder having a first magnet holder internal surface configured to slidably engage the central tubular member to engage the tubular drive member second end and a first magnet holder external surface configured to retain a ferromagnetic body or a first magnet. In particular embodiments, the ferromagnetic body or the first magnet can be configured to balance magnetic attraction force about the central tubular member to provide an angular positional tolerance for coaxial components of the first magnetic holder and the central tubular member to reduce resistance to movement of the first magnetic holder along the central tubular member. A second magnet holder comprising a second magnet holder external surface can be configured to held by the suturing apparatus housing in fixed spatial relation to the first magnet holder, wherein the second magnet holder can be configured to retain a ferromagnetic body or a second magnet having an opposite field pole to the first magnet. The ferromagnetic body or the second magnet having an opposite field pole to the first magnet disposed in the second magnet holder generates a magnetic attraction force in relation to the ferromagnetic body or the first magnet disposed in the first magnet holder. The magnetic attraction force can increase as the first magnet holder moves along the central tubular member toward the second magnetic holder. In particular embodiments, the magnetic attraction force can move the needle drive independent of any other forcible urging on the needle drive.

Another broad object of an embodiment of the invention can be to provide a method of making a suturing apparatus comprising one or more of: disposing a needle receiving chamber adjacent a substrate capture chamber in a suturing probe of a suturing apparatus; coupling a central tubular member to the suturing probe, the central tubular member having within a first longitudinal channel and a second longitudinal channel; slidably disposing a needle in the first longitudinal channel, the needle having a needle first end opposite a needle second end; slidably engaging a needle drive to the central tubular member, the needle drive coupled to the needle operates to drive the needle between a retracted condition having the needle first end entirely within the first longitudinal channel and an extended condition having the needle first end within the needle receiver of the suturing probe, the needle drive including one or more of: a compressible member receptacle having a receptacle first end having an inwardly extending first retainer ring defining a first end opening and a receptacle second end having an inwardly extending second retainer ring defining a second end opening; a tubular collar having collar first end opposite a collar second end, the collar first end having an annular shoulder and the collar second end configured to connect to the needle second end, the tubular collar telescopingly engaged in the first end opening engages the annular shoulder with the first retainer ring; a compressible member having a compressible member first end opposite a compressible member second end, the compressible member first end engaged to the annular shoulder of the collar first end, the compressible member second end engaged to the second retainer ring; and a tubular drive member having a tubular drive member first end engaged to the second retainer ring of the compressible member receptacle and a tubular drive member second end, the tubular drive member having a tubular drive member external surface configured to operably connect a needle drive actuator. Particular embodiments of the method can further comprise slidably engaging a first magnet holder on the central tubular member to engage the tubular drive member second end, the first magnet holder having a first magnetic holder external surface configured to retain a ferromagnetic body or a first magnet. In particular embodiments of the method, the ferromagnetic body or the first magnet can be configured to balance magnetic attraction force about the central tubular member to provide an angular positional tolerance for coaxial components of the first magnetic holder and the central tubular member to reduce resistance to movement of the first magnetic holder along the central tubular member. The method can further comprise configuring a second magnet holder to held by the housing of the suturing apparatus in fixed spatial relation to the first magnet holder, the second magnet holder configured to retain the ferromagnetic body or a second magnet having an opposite field pole to the first magnet, wherein the ferromagnetic body or a second magnet disposed in the second magnet holder having an opposite field pole to the first magnet generates a magnetic attraction force in relation to the ferromagnetic body or the first magnet disposed in the first magnet holder, wherein the magnetic attraction force increases as the first magnet holder moves along the central tubular member toward the second magnetic holder until the magnetic attraction force operates the needle drive independent of any forcible urging by a user. In particular embodiments, the method can further coupling a vacuum source to the second longitudinal channel disposed in the central tubular member, the second longitudinal channel fluidically coupled to the substrate capture chamber.

Naturally, further objects of the invention are disclosed throughout other areas of the specification, drawings, photographs, and claims.

V. DETAILED DESCRIPTION OF THE INVENTION

Generally, with reference to FIGS. 1, 2A-F, 3A-3B, 4A-B, 5A-5B and 6A-6B, embodiments of the suturing apparatus (1) can include a suture apparatus housing (2) (also referred to as the "housing") and a central tubular member (3) disposed in and extending from the housing (2) to terminate in a suturing probe (4) including a substrate capture chamber (5) and a needle receiving chamber (6). The central tubular member (3) has formed within a first longitudinal channel (7) and a second longitudinal channel (8). A needle (9) slidably engages the first longitudinal channel (7) to move by operation of a needle drive (10) from a retracted condition (11) within the first longitudinal channel (7) to an extended condition (12) to enter the needle receiving chamber (6). The second longitudinal channel (8) fluidically couples a vacuum source (13) to the substrate capture chamber (5) to regulate pressure (P) within the second longitudinal channel (8) and the substrate capture chamber (5) in relation to ambient pressure (AP) outside of the substrate capture chamber (5).

Now, with general reference to FIGS. 7A through 7D and FIGS. 8A through 8E, the suturing probe (4) can be configured to pass through a body opening (BO), including a natural body opening or an incision to engage a substrate(S). While particular examples of a substrate(S) include a tissue, including human or animal tissue, this description is not intended to preclude the capture of a substrate(S) other than human or animal tissue, including as illustrative examples, cadaver tissue, simulants of tissue, tissue models, elastomer components, plastic or natural fabrics, or the like.

Now, with primary reference to FIGS. 1, 2A-2C, in particular embodiments, the substrate capture chamber (5) can include a substrate capture chamber sidewall (14) coupled in opposed fixed relation a substrate capture chamber bottom (15) a distance from a substrate capture chamber port (16) open to a suturing probe external surface (17). In particular embodiments, the suturing probe external surface (17) can, but need not necessarily, comprise a recessed external surface (18) delimiting an open area (OA). The substrate capture chamber port (16) delimits a substrate capture chamber entry (19) into the substrate chamber (5) open to the recessed external surface (18), wherein the substrate capture chamber port (16) circumscribes a substrate capture chamber entry area less than the area delimited by the periphery margin (20) of the recessed external surface (18) which delimits the open area (OA). In particular embodiments, the needle receiving chamber (6) opens into the recessed external surface (18) outside of the substrate capture chamber (5) and the needle (9) slidably engaged to the first longitudinal channel (7) can move by operation of a needle drive (10) from the retracted condition (11) within the first longitudinal channel (7) to the extended condition (12) passing through the open area (OA) delimited by the recessed external surface (18) outside of the substrate capture chamber (5) to enter the needle receiving chamber (6). This illustrative example does not preclude the use of other suturing probes configured with or without a recessed external surface outside of the substrate capture chamber (5), and includes as an illustrative example, the probe (4) including a recessed external surface disclosed in U.S. Pat. No. 11,103,236, hereby incorporated by reference herein.

There can be an advantage in having a recessed external surface (18) in that it can increase the area of the suturing probe external surface (17) contacting a substrate(S). The increased area of the suturing probe external surface (17) can afford a substantial advantage in capture of a substrate (S) in those embodiments in which a reduced pressure (P) can be generated in the substrate capture chamber (5) or can decrease movement of the suturing probe (4) in relation to the substrate(S) captured in the substrate capture chamber (5). Additionally, there can be an advantage in the needle (7) passing outside of the substrate capture chamber (5). In the first instance, the needle (7) may not require a seal about the needle body (21) to maintain reduced pressure (P) in the substrate capture chamber (5). In the second instance, the needle (7) penetrates the substrate(S) outside of the substrate capture chamber (5) and the penetrations in the substrate(S) are not under reduced pressure which in the case of tissue can reduce the flow of fluids from the penetrations in the tissue.

Figure 1:
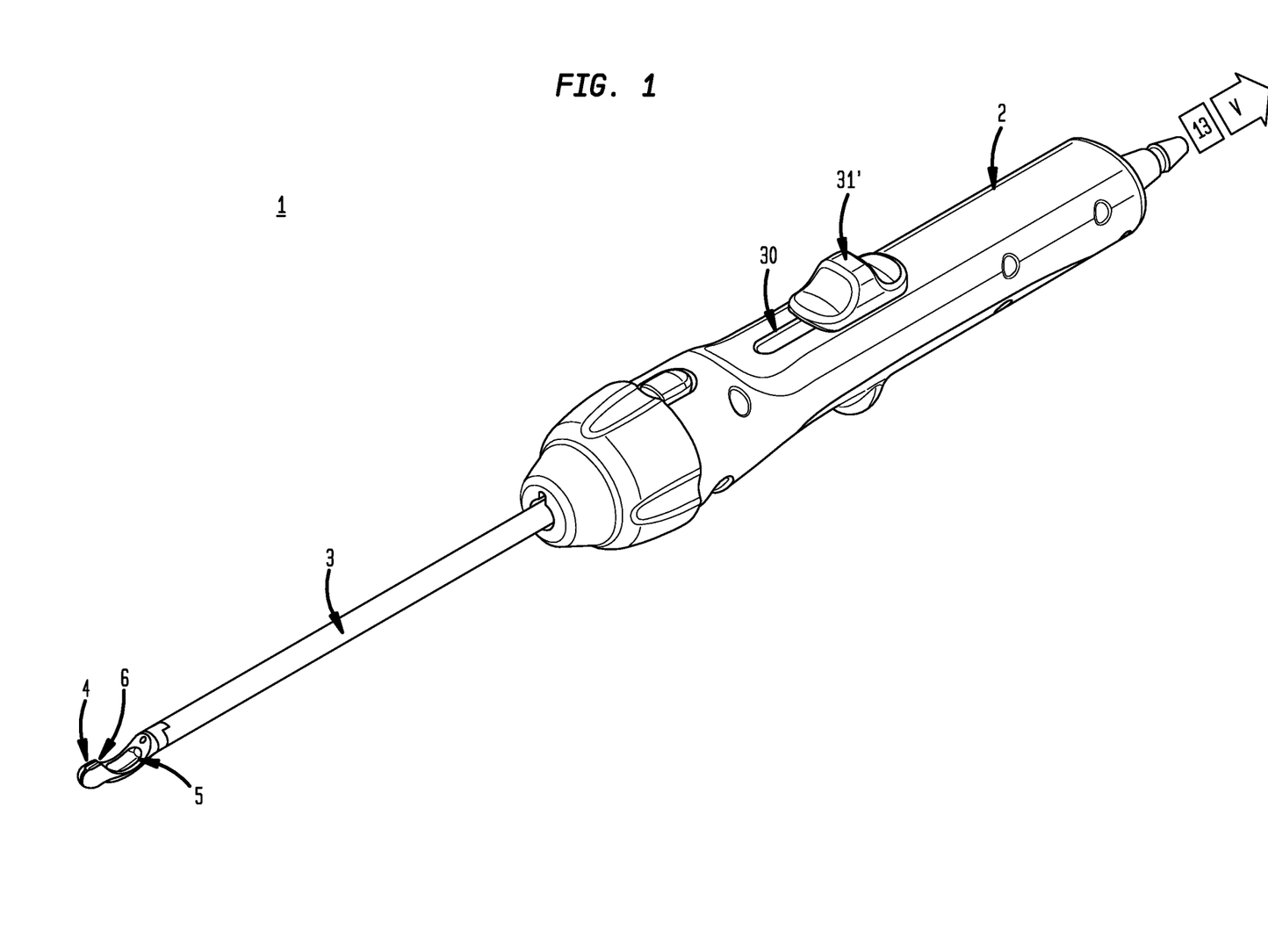
FIG. 1 is a first perspective view of an embodiment of the suturing apparatus having the needle disposed in a retracted condition.
Figure 2A:
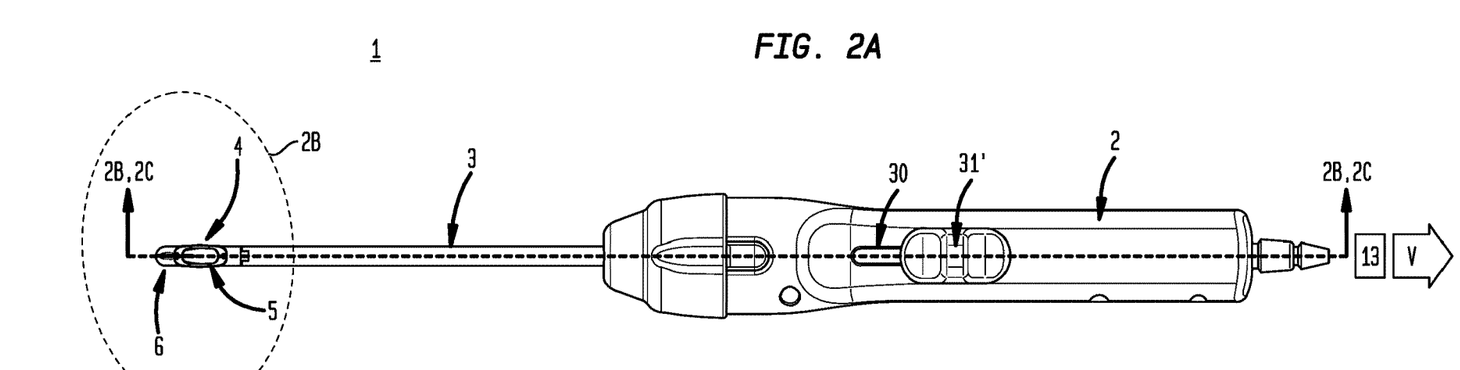
FIG. 2A is a top plan view of the embodiment of the suturing apparatus shown in FIG. 1.
Figure 2B:
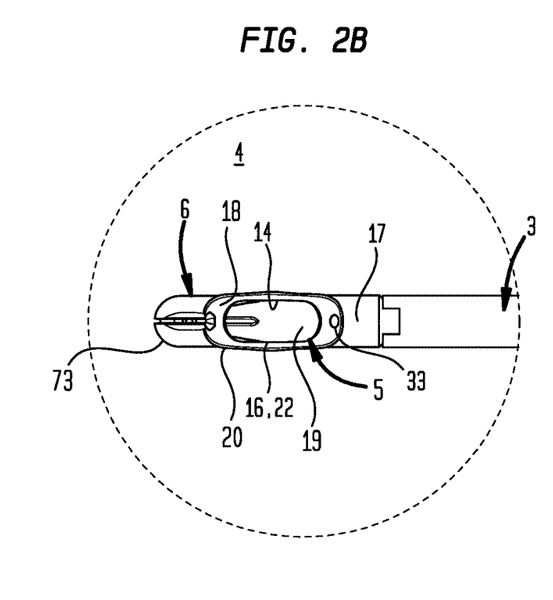
FIG. 2B is an enlarged top plan view of a portion of FIG. 2A.

Now, with primary reference to FIGS. 2A and 2B, the substrate capture chamber port (16) can, but need not necessarily, be disposed in a stadium configuration (22), being a rectangle with semicircles at a pair of opposite ends. The substrate capture chamber (5) can, but need not necessarily, have a substrate capture chamber bottom (15) in a stadium configuration disposed opposite the substrate capture chamber port (16) in stadium configuration connected by a substantially vertical chamber sidewall (14). There can be an advantage in a substrate capture chamber (5) of stadium configuration (22) in that an increased amount of substrate(S) can be disposed in the substrate capture chamber (5) as compared to a substrate capture chamber (5) having conventionally slotted or substantially circular substrate capture chamber (5), and correspondingly, the substrate(S) penetrated by the needle (9) can dispose a thread entry point and a thread withdraw point a greater distance apart (also referred to as the "suture purchase") as compared to conventional slotted or cylindrical suction chambers. The suture purchase generated by use of a stadium configuration (22) can be substantially greater than that obtained using a suction chamber of cylindrical configuration or obtained using a conventional suction chamber of slotted configuration. It may be that the conventional cylindrical configuration draws the substrate into a conical configuration within the conventional cylindrical suction chamber and the conventional needle only penetrates the substrate proximate the apex of the cone. It may be that the conventional slotted suction chamber does not have sufficient volume to dispose the substrate a sufficient distance into the conventional slotted chamber and the conventional needle only penetrates the substrate layers in adjacent relation close to the fold or edges. This illustrative example of a substrate capture chamber (5) is not intended to preclude other configurations of a substrate capture chamber (5), and includes for example, the substrate capture chamber disclosed in U.S. Pat. No. 10,660, 637, hereby incorporated by reference herein.

Figure 2C:
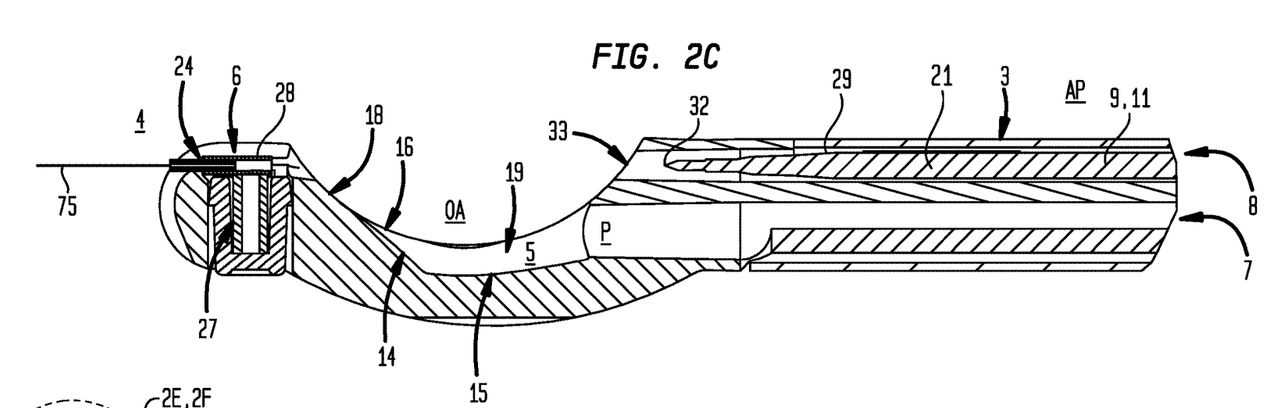
FIG. 2C is a cross section view 2C-2C of the enlarged top plan view of FIG. 2A.
Figure 2D:
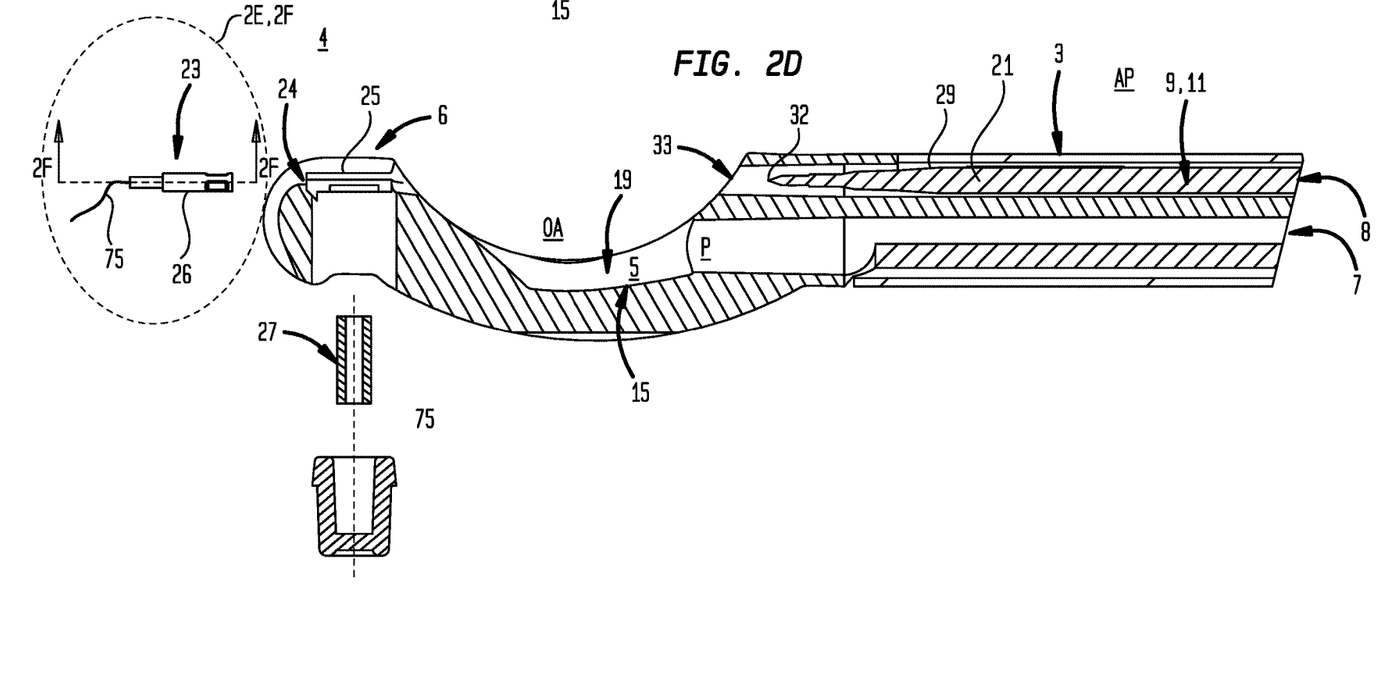
FIG. 2D is an exploded cross section view 2D-2D of FIG. 2C.
Figure 2E:
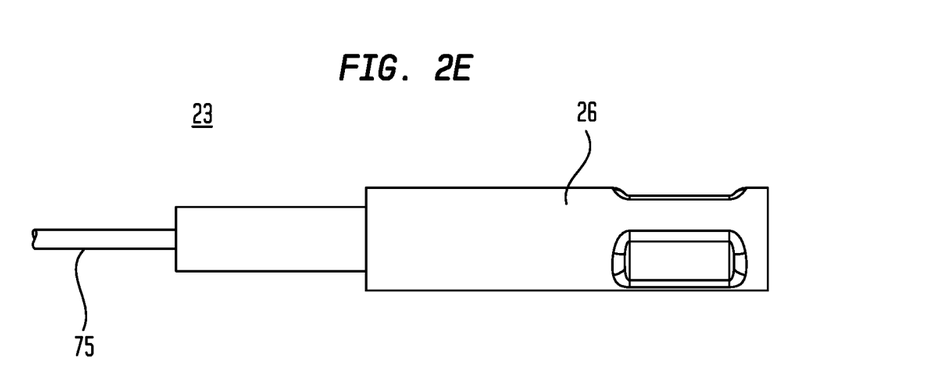
FIG. 2E is an enlarged side elevation view of the embodiment of the suture ferrule shown in FIG. 2D.
Figure 2F:
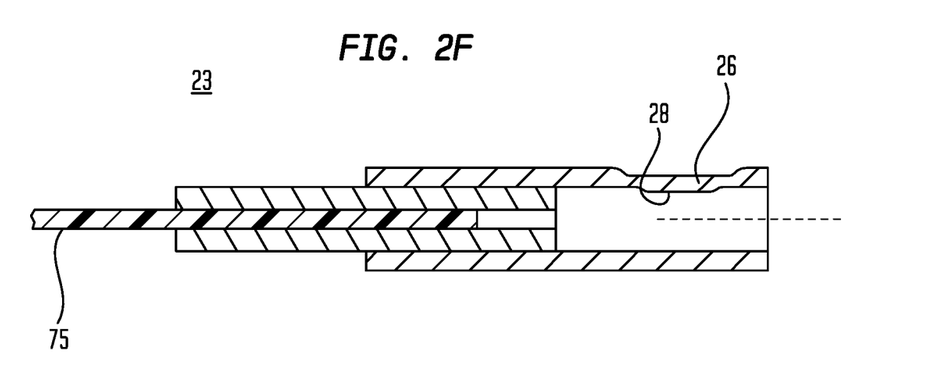
FIG. 2F is a cross section side elevation view of the embodiment of the suture ferrule shown in FIG. 2E.

Now, with primary reference to FIGS. 2C, 2D and 2E, which illustrate a needle receiving chamber (6) adapted to hold a suture ferrule (23). In the particular illustrative example, the needle receiving chamber (6) can include a suture ferrule holder (24) having a suture ferrule holder internal surface (25) which substantially conforms to the suture ferrule external surface (26) allowing the suture ferrule (23) to insertingly engage the suture ferrule holder (24). A compressible ferrule retainer (27) disposed in the needle receiving chamber (6) can compressibly engage the suture ferrule (23) upon insertion into the suture ferrule holder (24) to retain the suture ferrule (23) in the suture ferrule holder (24). The suture ferrule (23) can have a ferrule internal surface (28) and the needle (9) can have a needle external surface (29) configured to mateably engage in the extended condition (12) of the needle (9). Mateable engagement of the needle (9) with the suture ferrule internal surface (28) allows the suture ferrule (23) be withdrawn from the suture ferrule holder (24) as the needle (9) returns toward the retracted condition (11). This illustrative example of a needle receiving chamber ( ) is not intended to preclude other configurations of a needle receiving chamber, or thread capture chamber, and includes, for example, the thread capture chamber disclosed in U.S. Pat. No. 10,898,181, hereby incorporated by reference herein.

Figure 3A:
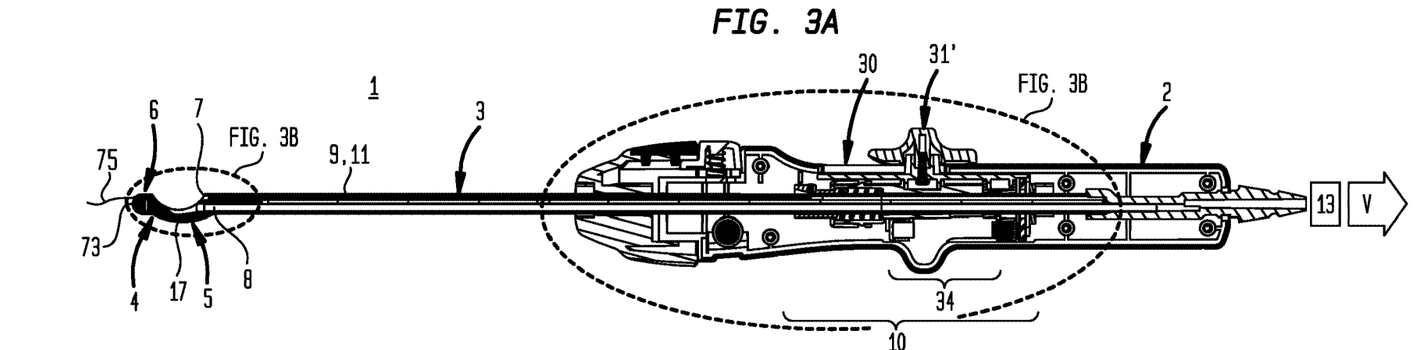
FIG. 3A is cross section view 3A-3A of the embodiment of the suturing apparatus shown in FIG. 2 having the needle in the retracted condition.
Figure 3B:
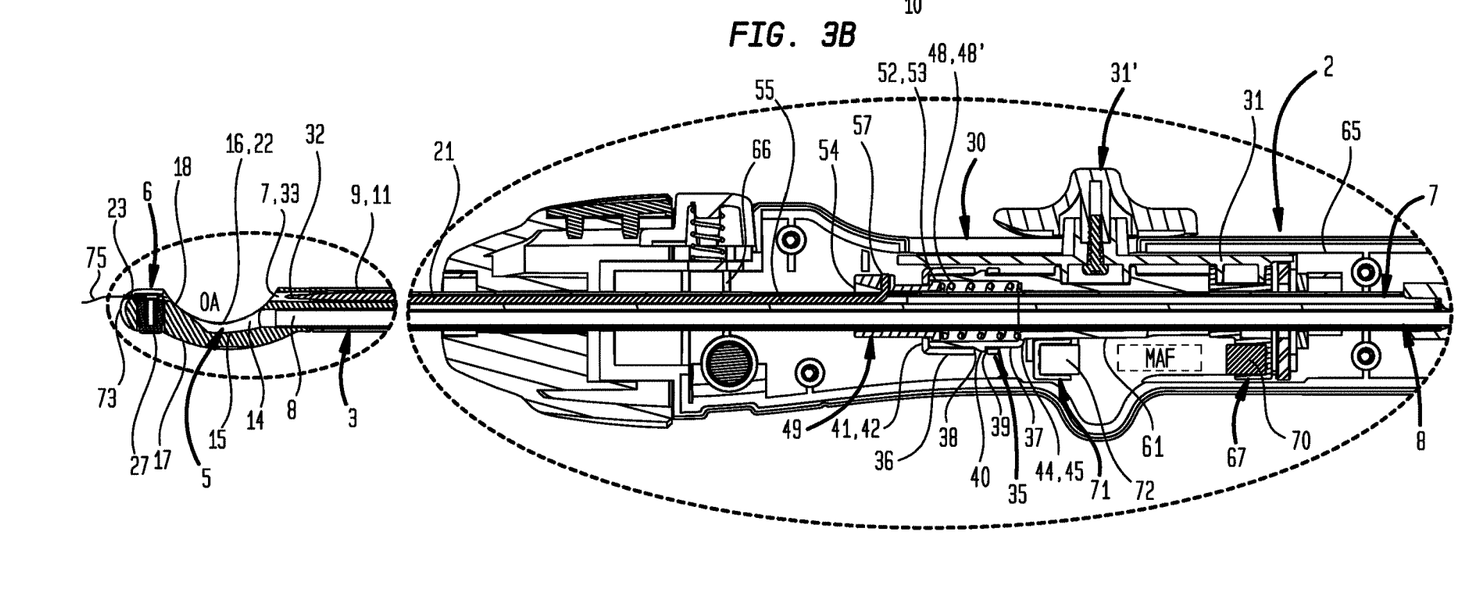
FIG. 3B is an enlarged cross section view of a portion of the embodiment of the suturing apparatus shown in FIG. 3A.
Figure 4A:
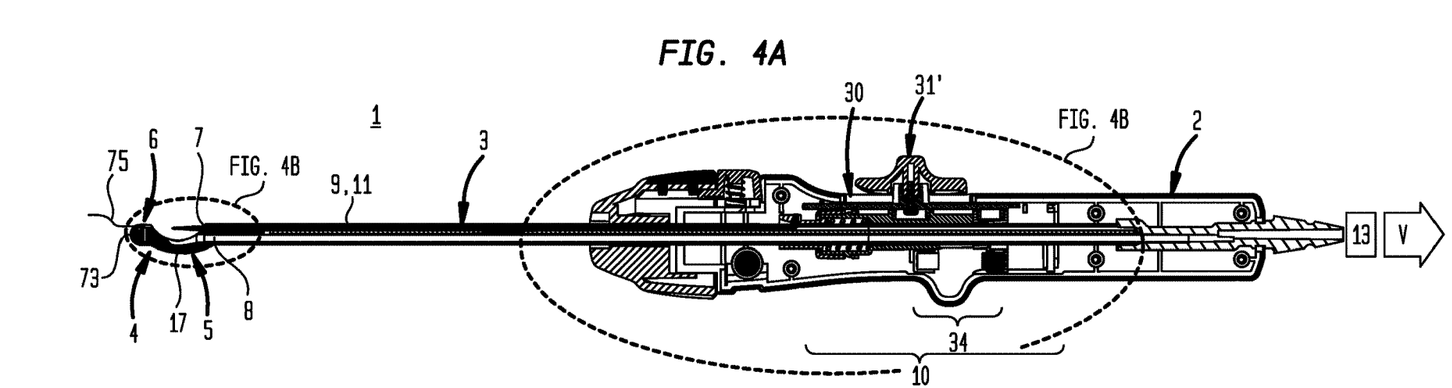
FIG. 4A is cross section view 4A-4A of the embodiment of the embodiment of the suturing apparatus shown in FIG. 2 having the needle in partially extended condition.
Figure 4B:
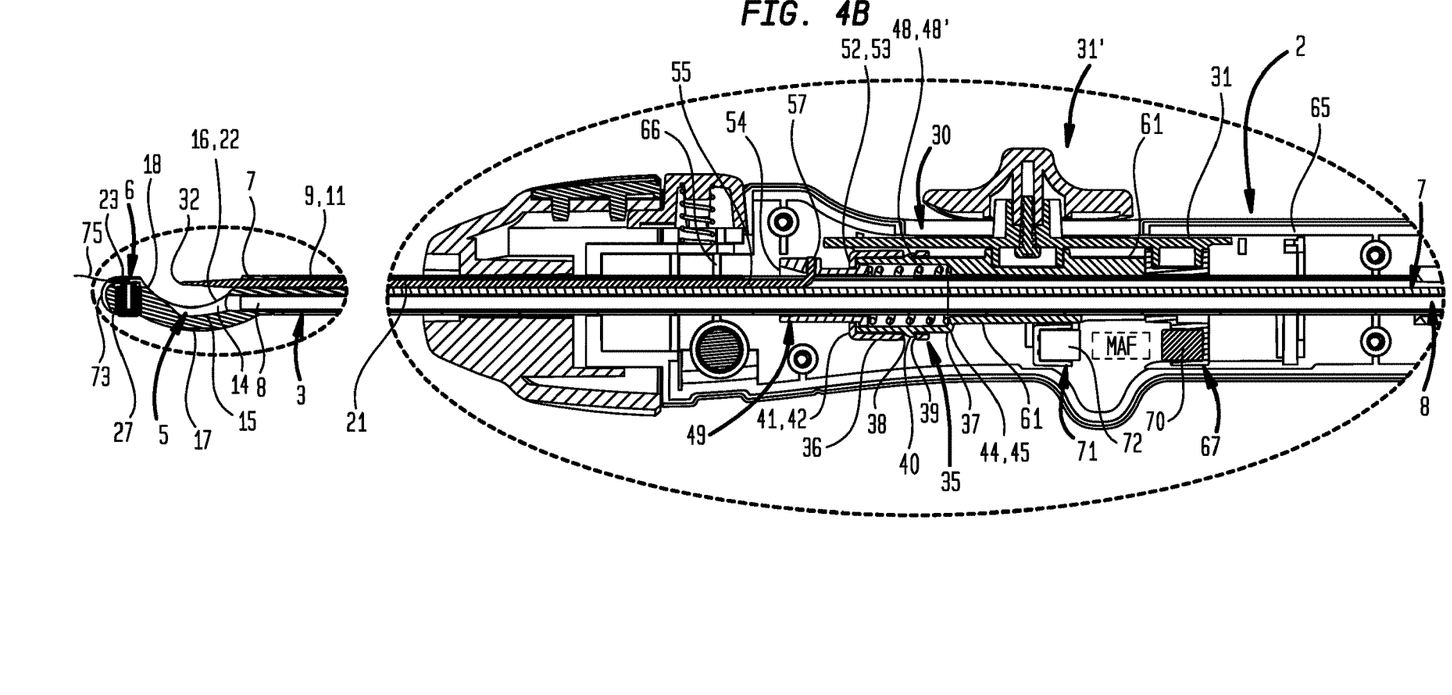
FIG. 4B is an enlarged cross section view of portions of the embodiment of the suturing apparatus shown in FIG. 4A.
Figure 5A:
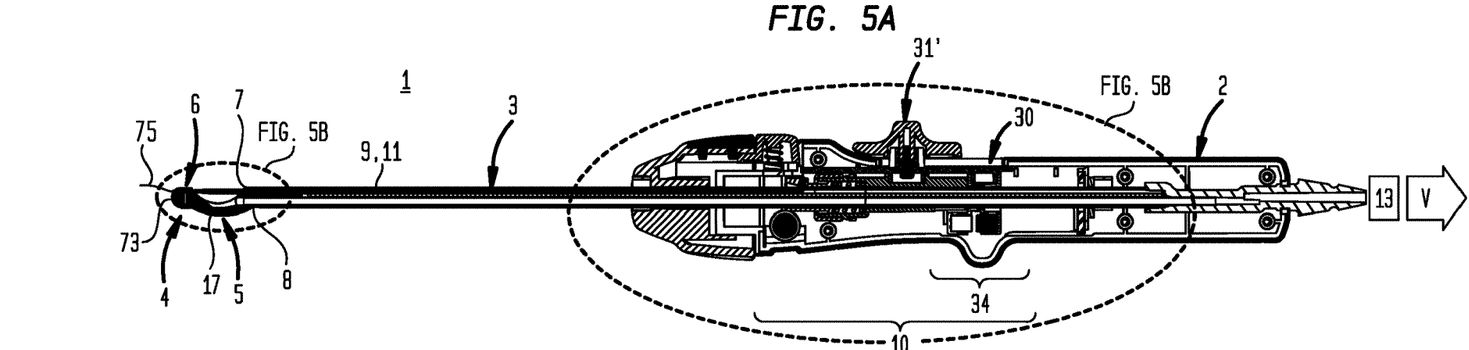
FIG. 5A is cross section view 5A-5A of the embodiment of the suturing apparatus shown in FIG. 2 having the needle in a fully extended condition.
Figure 5B:
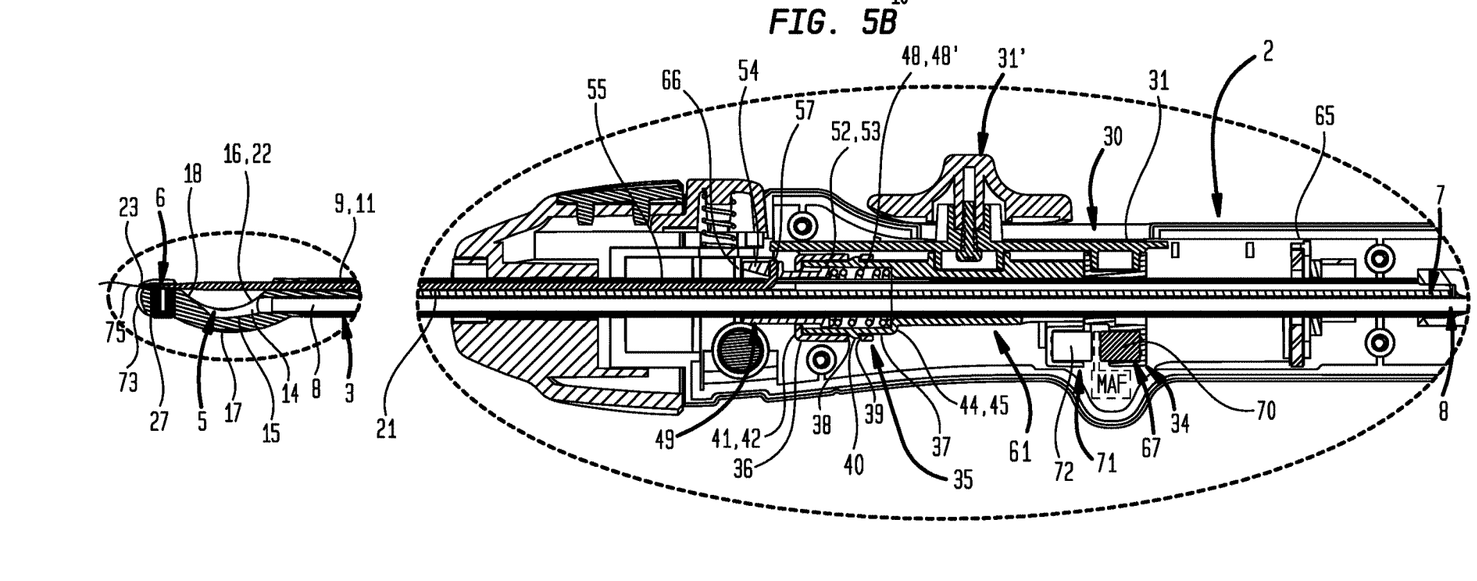
FIG. 5B is an enlarged cross section view of portions of the suturing apparatus shown in FIG. 5A.

Now, with primary reference to FIGS. 3A and 3B, 4A and 4B, 5A and 5B, embodiments can include a needle drive (10) configured to move the needle (9) reciprocally slidably engaged in the first longitudinal channel (7) of the central tubular member (3). As to particular embodiments, a needle drive actuator slot (30) can be disposed in the housing (2) and a needle drive actuator (31) can be configured to extend through the needle drive actuator slot (30) to present a pressable needle drive actuator button (31') which upon forcible urging generates travel along the needle drive actuator slot (30) to generate corresponding axial movement of the needle (9) in the first longitudinal channel (7) of the central tubular member (3). As to particular embodiments, the needle drive actuator (31) can be operated bidirectionally to concurrently reciprocally position the needle (9) between a needle retracted condition (11) which can locate the needle (9) partially or entirely inside of the first longitudinal channel (7) (as shown in the example of FIGS. 3A and 3B) and a needle extended condition (12) which can locate a needle first end (32) of the needle (9) medially between a first longitudinal channel opening (33) and the needle receiving chamber (6) (as shown in the example of FIGS. 4A and 4B) or locate the needle first end (32) within the needle receiving chamber (6) (as shown in the examples of FIGS. 5A and 5B).

Now, with primary reference to FIGS. 3A and 3B, 4A and 4B, 5A and 5B, and 6A and 6B, in particular embodiments, the needle drive (10) can, but need not necessarily, include a magnetic drive (34). Accordingly, the magnetic drive (34) can be a discrete invention, or as an invention in various permutations and combinations with varying embodiments of one or more of: the needle (9), the suturing probe (4), the substrate capture chamber (5), and the needle receiving chamber (6) and the needle drive (10).

Figures 6A, 6B:
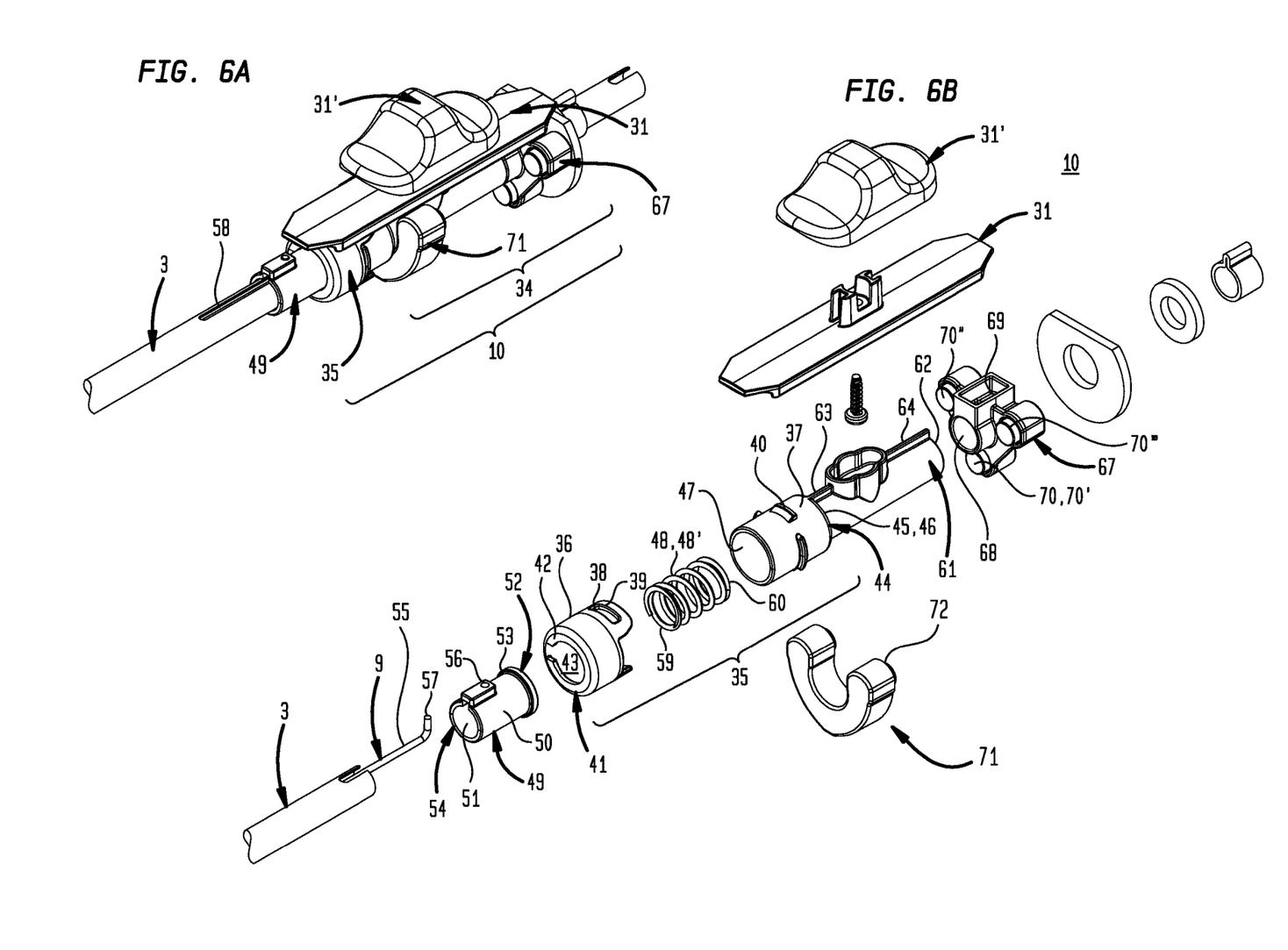
FIG. 6A is a perspective view of a particular embodiment of a needle drive including a magnetic drive.
FIG. 6B is an exploded view of the particular embodiment of the needle drive including the magnetic drive assembly shown in FIG. 6A.

Now, with primary reference to FIG. 6A, which illustrates the structural relationship of the components of a particular embodiment of the needle drive (10) including the magnetic drive (34) slidably assembled on the central tubular member (3) with the housing (2) of the suturing apparatus (1) removed, and FIG. 6B which provides an exploded view of the particular embodiment of FIG. 6A which illustrates the structural relationship of each component of the particular embodiment of the needle drive (10) including the magnetic drive (34) shown in FIG. 6A.

In particular embodiments, the needle drive (10) can include a compressible member receptacle (35). The compressible member receptacle (35) can include a first compressible member receptacle portion (36) which secures to a second compressible member receptacle portion (37). In the illustrative example of FIG. 6B, the first compressible member receptacle portion (36) telescopingly engages the second compressible member receptacle portion (37) until one or more apertures (38) in one or more resiliently flexible leaves (39) on the first compressible member receptacle portion (36) correspondingly receive one or more detents (40) outwardly extending from the second compressible member receptacle portion (37). The illustrative example of telescoping engagement of the first compressible member receptacle portion (36) and the second compressible member receptacle portion (37) to correspondingly receive one or more detents (40) outwardly extending from the second compressible member receptacle portion (37) in one or more apertures (38) of the first compressible member receptacle portion (36) is not intended to preclude other embodiments which may include alternate structures such as mated threads, interlocking flanges, mechanical fasteners, or clips. The assembled compressible member receptacle (35) of the illustrative example, includes a receptacle first end (41) having an inwardly extending first retainer ring (42) defining a first end opening (43) and a receptacle second end (44) having an inwardly extending second retainer ring (45) defining a second end opening (46) and defines a receptacle internal surface (47) configured to receive a compressible member (48). In the illustrative example of FIG. 6B, the compressible member (48) comprises a coil spring (48') of helically wound wire having an external dimension allowing the coil spring (48') to be disposed inside of the compressible member receptacle (35) and having and internal dimension sufficiently large to allow the central tubular member (3) to pass through the coil spring (48') when assembled inside of the compressible member receptacle (35). The illustrative example of a coil spring (48') is not intended to preclude other embodiments of a compressible member (48) that upon compression stores mechanical potential energy and releases that energy returning to the uncompressed condition, such as: wave springs, torsion springs, resiliently flexible leaves, disk springs, conical springs, tubular elastomers, or combinations thereof.

The needle drive (10) shown in the illustrative examples of FIG. 6A and FIG. 6B can further include a tubular collar (49) including a collar external surface (50) disposed through the first end opening (43) of the compressible member receptacle (35) and a collar internal surface (51) configured to slidably engage the central tubular member (3). A collar first end (52) can include an outwardly extending annular shoulder (53). The tubular collar (49) disposed through the first end opening (43) of the compressible member receptacle (35) can engage the outwardly extending annular shoulder (53) with the first retainer ring (42) to prevent the tubular collar (49) from passing through the first end opening (43) of the compressible member receptacle (35). A collar second end (54) can be configured to connect to a needle second end (55). In the illustrative examples of FIGS. 6A and 6B, the collar second end (54) includes a collar aperture (56) open between the collar internal surface (51) and the collar external surface (50) proximate the collar second end (54). The needle second end (55) forms a bend to dispose a needle second end portion (57) across the longitudinal axis of the needle (9). The needle (9) disposed in the first longitudinal channel (7) of the central tubular member (3) allows the needle second end portion (57) to pass through the collar aperture (56) disposed proximate the collar second end (54). The central tubular member (3) can include a slot (58) disposed along the longitudinal axis to allow the needle second end portion (57) inserted through the collar aperture (56) disposed proximate the collar second end (55) to travel in the slot (58) to move the needle (9) between the retracted condition (11) and the extended condition (12). The compressible member (48) includes a compressible member first end (59) and a compressible member second end (60). The compressible member (48) inserts into the compressible member receptacle (35) with the compressible member first end (59) abutting the annular shoulder (53) of the collar second end (54) and with the compressible member second end (60) abutting the second retainer ring (45) of the compressible member receptacle (35) and with the central tubular member (3) passing through the compressible member (48).

The needle drive (10) shown in the illustrative examples of FIG. 6A and FIG. 6B can further include a tubular drive member (61) having a tubular drive member internal surface (62) configured to slidably engage the central tubular member (3). The tubular drive member (61) having a tubular drive member first end (63) engaged to the second retainer ring (45) of the compressible member receptacle (35) and a tubular drive member second end (64). The tubular drive member (61) can have a tubular drive member external surface (65) configured to operably connect to the needle drive actuator (31). Movement of the needle drive actuator (31) correspondingly moves the compressible member receptacle (35) and the tubular collar (49) forward generating travel of the needle (9) in the first longitudinal channel (7) of the central tubular member (3). The tubular collar (49) can telescopingly engage the first end opening (43) of the compressible member receptacle (35) to compress the compressible member (48) to absorb the force of resistance to movement of the needle (9) or the tubular collar (49). The housing (2) can include a housing internal surface (65) configured to provide a tubular collar stop (66) which the collar second end (54) engages to cease travel of the needle (9) in the fully extended condition (12). Further forcible urging on the pressable needle drive actuator button (31') causes telescoping engagement of the tubular collar (49) in the first end opening (43) of the compressible member receptacle (35) to compress the compressible member (48).

Now, with primary reference to FIGS. 3A and 3B, 4A and 4B, 5A and 5B, and 6A and 6B, particular embodiments of the needle drive (10) can, but need not necessarily include, a magnetic drive (34). As shown in the illustrative examples of FIG. 6A and FIG. 6B the magnetic drive (34) can include a first magnet holder (67) having a first magnet holder internal surface (68) configured to slidably engage the central tubular member (3) to engage the tubular drive member second end (64). The first magnet holder (67) can include a first magnet holder external surface (69) configured to couple to the needle drive actuator (31), whereby movement of the needle drive actuator (31) or the pressable needle drive actuator button (31') correspondingly moves the first magnet holder (67) along the central tubular member (3). The first magnet holder (67) can be configured to hold a first magnet (70). In particular embodiments, the first magnet (70) can be only one magnet (70), while in other embodiments the first magnet (70) can comprise a plurality of magnets (70', 70", 70"' . . . 70"). As shown in the illustrative example of FIGS. 6A and 6B, the first magnet (70) can, but need not necessarily, comprises three magnets (70', 70", 70"'). There can be an advantage to a plurality of radially spaced apart magnets (70', 70", 70"') to balance the magnetic attraction force (MF) about the central tubular member (3) to provide angular positional tolerance for the coaxial parts of the first magnetic holder (67) and the central tubular member (3) to avoid or reduce resistance to movement of the first magnetic holder (67) on the central tubular member (3) to avoid jamming. The illustrative example of three magnets (70', 70", 70"') is not intended to preclude the use of one magnet, two magnets, or more than three magnets based on geometry and size that make it possible to reduce resistance to movement or to avoid jamming.

The magnetic drive (34) shown in the illustrative examples of FIG. 6A and FIG. 6B can further include a second magnet holder (71). The housing internal surface (65) can be configured to hold the second magnet holder (71) in a fixed spatial location. The second magnet holder (67) can be configured to hold a second magnet (72) having an opposite field pole to the first magnet (70), whereby magnetic attraction force (MF) increases as the first magnetic holder (67) slides along the central tubular member (3) toward the second magnet holder (71). In particular embodiments, the second magnet (72) may be replaced with a ferromagnetic metal such as iron, nickel, cobalt, and alloys thereof.

Now, with primary reference to FIGS. 3A, 3B, 4A, 4B, 5A and 5B, which illustrate the operation of the needle drive (10) and the needle drive (10) in combination with the magnetic drive (34). As shown in FIGS. 3A and 3B, the retracted condition (11) of the needle (9) disposes the needle drive actuator (31) at a position in the needle drive actuator slot (30) distal from the probe tip (73) and the first magnet holder (67) distal from the second magnet holder (71). The magnetic attraction force (MF) between the first magnet (70) and the second magnet (72) in the retracted condition (11) of the needle (9) can be insufficient to move the needle drive actuator (31) toward the extended condition (12) of the needle (9) without forcible urging by a user on the needle drive actuator (31) or needle drive actuator button (31') to generate corresponding axial movement of the needle (9) in the first longitudinal channel (7) of the central tubular member (3).

Now, with primary reference to FIGS. 4A and 4B, forcible urging on the needle drive actuator (31) or the needle drive actuator button (31') generates corresponding axial movement of the needle (9) in the first longitudinal channel (7) of the central tubular member (3) and closes the distance between the first magnetic holder (67) and the second magnetic holder (71) and increases the magnetic attraction (MF) between the first magnet (70) and the second magnet (72). The increased magnetic attraction force (MF) between the first magnet (70) and the second magnet (72) can offset some of the force applied to the needle drive actuator button (31') to move the needle (9) in the first longitudinal channel (7).

Now, with primary reference to FIGS. 5A and 5B, as operation of the needle drive (10) further extends the needle (9) toward the extended condition (12), the magnetic attraction force (MF) between the first magnet (70) and the second magnet (72) can become sufficient to extend the needle (9) toward the fully extended condition (12) without forcible urging by a user of the needle drive actuator (31) or needle drive actuator button (31'). The tubular collar (49) can then move under only the influence of the magnetic attraction force (MF) between the first magnet (70) and the second magnet (72) or under the combination of forcible urging of the needle drive actuator button (31') and the magnetic attraction force (MF) between the first magnet (70) and the second magnet (72) until the tubular collar (49) engages the tubular collar stop (66) with the compressible member (48) compressing to absorb the impact or additional force associated with the continued magnetic attraction force (MF) or forcible urging of the needle drive actuator (31) or needle drive actuator button (31').

Figure 7A:
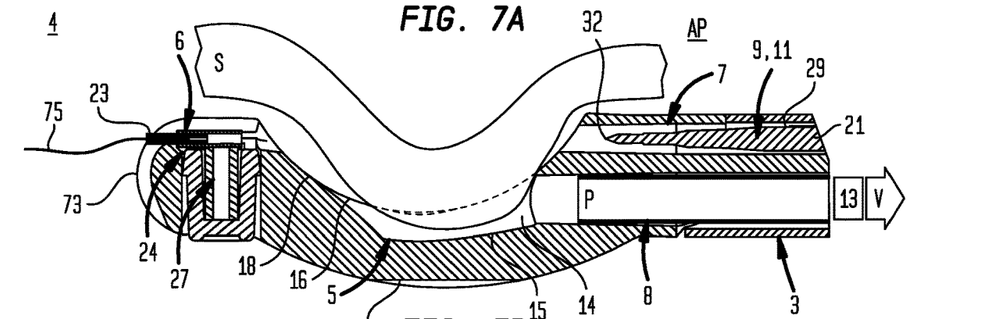
FIG. 7A is a cross section view of the particular embodiment of the suture probe shown FIG. 2B depicting a particular method of using the embodiment of the suturing apparatus shown in FIGS. 1 and 2A having the needle in the retracted condition.
Figure 7B:
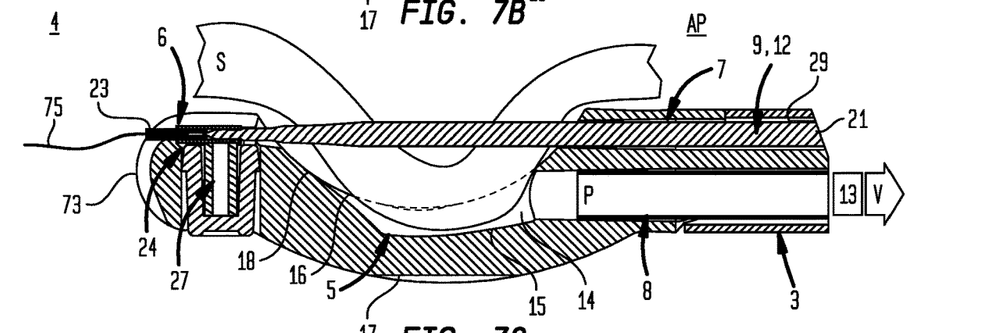
FIG. 7B is cross section view of the particular embodiment of the suture probe shown FIG. 2B depicting a particular method of using the embodiment of the suturing apparatus shown in FIGS. 1 and 2A in which the needle in the extended condition passes through a substrate captured in the substrate capture chamber and engages a suture ferrule disposed in the needle receiving chamber.
Figure 7C:
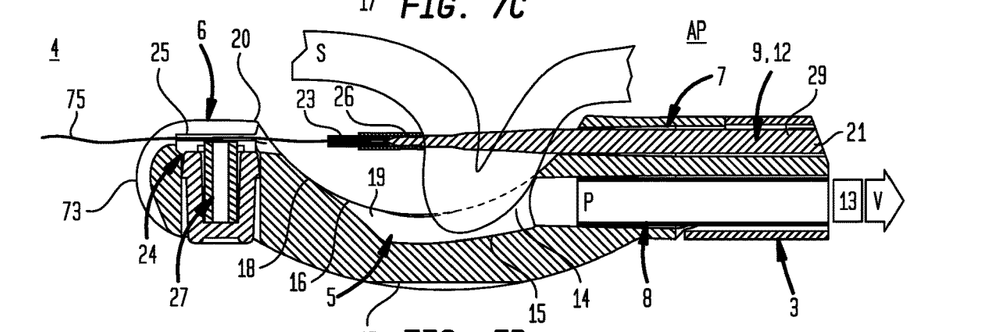
FIG. 7C is cross section view of the particular embodiment of the suture probe shown FIG. 2B depicting a particular method of using the embodiment of the suturing apparatus shown in FIGS. 1 and 2A in which the needle withdraws from the needle receiving chamber carrying the suture ferrule.
Figure 7D:
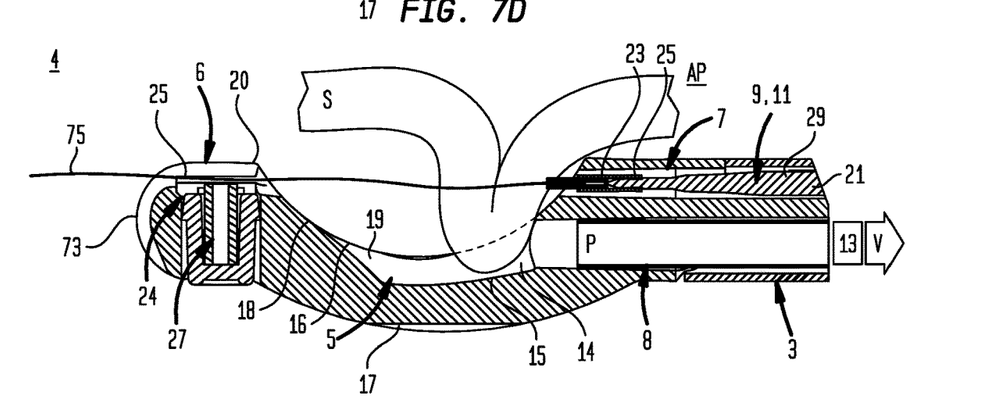
FIG. 7D is cross section view of the particular embodiment of the suture probe shown FIG. 2B depicting a particular method of using the embodiment of the suturing apparatus shown in FIGS. 1 and 2A in which the needle draws the suture ferrule through the substrate to dispose a suture in the substrate.
Figure 8A:
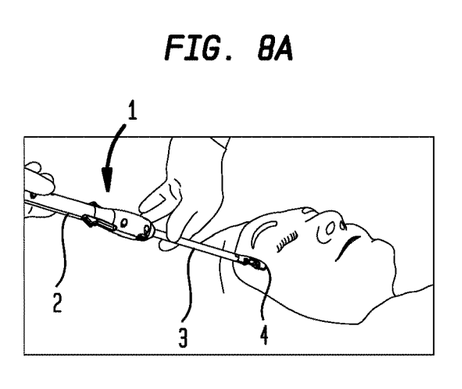
FIG. 8A is a depiction of a particular method of using a suturing apparatus.
Figure 8B:
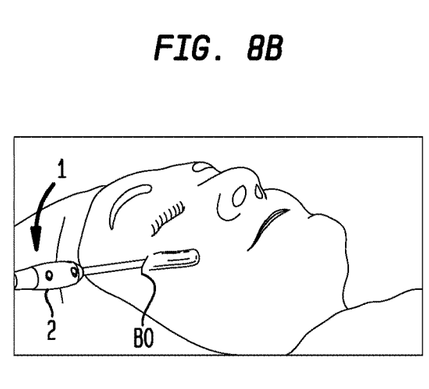
FIG. 8B is a depiction of a particular method of inserting a suturing probe in a body opening.
Figure 8C:
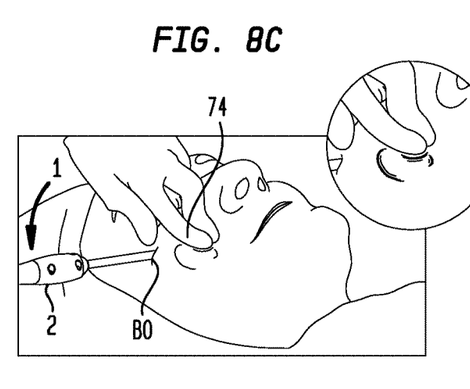
FIG. 8C is a depiction of a particular method of palpating a substrate toward a substrate capture chamber.
Figure 8D:
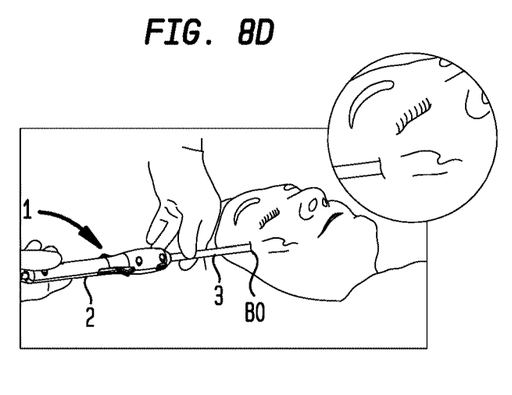
FIG. 8D is a depiction of a particular method of operating the suturing apparatus to drive the needle through a substrate.
Figure 8E:
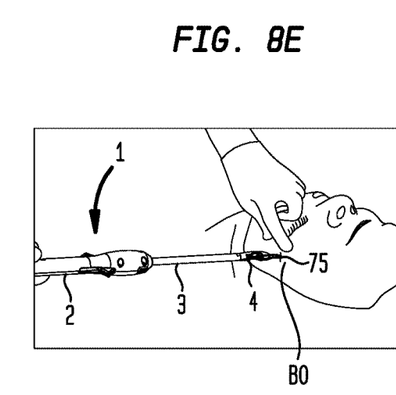
FIG. 8E is a depiction of a particular method of disposing suture in the substrate and removing a suturing probe from a body opening.

Now, with primary reference to FIGS. 7A through 7D and FIGS. 8A through 8E, a method in a suturing apparatus (1) can include retaining a suture ferrule (23) in the suture ferrule holder (24) (as shown in the example of FIGS. 7A and 8A). Inserting a suturing probe (4) into a body opening (BO) of a substrate(S) (as shown in the example of FIG. 8B). Urging the substrate(S) toward a substrate capture chamber (5) disposed in the suturing probe (4) which as to particular embodiments, may include contacting the substrate(S) with a finger (74), or other instrument, or device (as shown in the example of FIGS. 7A and 8C). Capturing the substrate(S) in the substrate capture chamber (5), which can, but need not necessarily, include generating a reduced chamber pressure (P) in the substrate capture chamber (5) by operation of a vacuum source (13) to draw and retain an amount of the substrate(S) in the substrate capture chamber (2) (as shown in FIGS. 7A and 8D). Driving a needle (9) slidably engaged in the first longitudinal channel (7) of the central tubular member (3) toward a needle receiving chamber (6) by operation of the needle drive (10) and/or the magnetic drive (34) (as shown in the example of FIGS. 4A and 4B). Passing the needle (3) through the substrate(S) outside of the substrate capture chamber (5) into the needle receiving chamber (6) (as shown in the example of FIG. 7B). Engaging the needle (9) with a suture ferrule (23) disposed in the needle receiving chamber (6) (as shown in FIG. 7B). Capturing the suture ferrule (23) by engagement of the needle external surface (29) proximate the needle first end (32) with suture ferrule internal surface (25) (as shown by FIG. 7B). Reciprocally driving the needle (9) carrying the suture ferrule (23) from the needle receiving chamber (6) and through the substrate(S) to dispose a suture (75) in the substrate(S) (as shown in the example of FIGS. 7C, 7D and 8E).

As can be easily understood from the foregoing, the basic concepts of the present invention may be embodied in a variety of ways. The invention involves numerous and varied embodiments of a suturing apparatus (1) and methods for making and using such suturing apparatus (1) including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "suture" should be understood to encompass disclosure of the act of "suturing"—whether explicitly discussed or not—and, conversely, were there is a disclosure of the act of "suturing", such a disclosure should be understood to encompass disclosure of a "suture" and even a "means for suturing". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Additionally, for the purposes of the present invention, the term "integrated" when referring to two or more components means that the components (i) can be united to provide a one-piece construct, a monolithic construct, or a unified whole, or (ii) can be formed as a one-piece construct, a monolithic construct, or a unified whole. Said another way, the components can be integrally formed, meaning connected together so as to make up a single complete piece or unit, or so as to work together as a single complete piece or unit, and so as to be incapable of being easily dismantled without destroying the integrity of the piece or unit.

Thus, the applicant(s) should be understood to claim at least: i) each of the suturing apparatuses herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The elements following an open transitional phrase such as "comprising" may in the alternative be claimed with a closed transitional phrase such as "consisting essentially of" or "consisting of" whether or not explicitly indicated the description portion of the specification.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. A suturing apparatus, comprising:
   a suturing probe including a needle receiving chamber disposed adjacent a substrate capture chamber;
   a central tubular member coupled to said suturing probe, said central tubular member having within a first longitudinal channel and a second longitudinal channel;
   a needle having a needle first end opposite a needle second end, said needle slidably disposed in said first longitudinal channel;
   a needle drive slidingly engaged to said central tubular member, said needle drive coupled to said needle to drive said needle between a retracted condition having said needle first end entirely within said first longitudinal channel and an extended condition having said needle first end within a needle receiver of said suturing probe, wherein said needle drive including:
   a compressible member receptacle having a receptacle first end having an inwardly extending first retainer ring defining a first end opening and a receptacle second end having an inwardly extending second retainer ring defining a second end opening;
   a tubular collar having collar first end opposite a collar second end, said collar first end having an annular shoulder and said collar second end configured to connect to said needle second end, said tubular collar telescopingly engaged in said first end opening engages said annular shoulder with said first retainer ring;
   a compressible member having a compressible member first end opposite a compressible member second end, said compressible member first end engaged to said annular shoulder, said compressible member second end engaged to said second retainer ring; and
   a tubular drive member having a tubular drive member first end engaged to said second retainer ring of said compressible member receptacle and a tubular drive member second end, said tubular drive member having a tubular drive member external surface configured to operably connect to a needle drive actuator.

2. The suturing apparatus of claim 1, further comprising a first magnet holder having a first magnet holder internal surface configured to slidably engage said central tubular member to engage said tubular drive member second end, and a first magnet holder external surface configured to retain a ferromagnetic body or a first magnet.

3. The suturing apparatus of claim 2, wherein said ferromagnetic body or said first magnet retained by said first magnet holder comprises only one ferromagnetic body or only one magnet.

4. The suturing apparatus of claim 2, wherein said ferromagnetic body or said first magnet comprises a plurality of ferromagnetic bodies or a first plurality of magnets.

5. The suturing apparatus of claim 4, wherein said ferromagnetic body or said first magnet comprises three ferromagnetic bodies or three magnets.

6. The suturing apparatus of claim 4, wherein said plurality of ferromagnetic bodies or said first plurality of magnets disposed in radially spaced apart relation about said central tubular member.

7. The suturing apparatus of any one of claim 3, 4, or 5, wherein said ferromagnetic body or said first magnet configured to balance magnetic attraction force about said central tubular member to provide an angular positional tolerance for coaxial components of said first magnetic holder and said central tubular member to reduce resistance to movement of said first magnetic holder along said central tubular member.

8. The suturing apparatus of claim 2, further comprising a second magnet holder having a second magnet holder external surface configured to held by said housing in fixed spatial relation to said first magnet holder, said second magnet holder configured to retain said ferromagnetic body or a second magnet having an opposite field pole to said first magnet.

9. The suturing apparatus of claim 8, wherein said ferromagnetic body or a second magnet having an opposite field pole to said first magnet disposed in said second magnet holder generates a magnetic attraction force in relation to said ferromagnetic body or said first magnet disposed in said first magnet holder.

10. The suturing apparatus of claim 9, wherein said magnetic attraction force increases as said first magnet holder moves along said central tubular member toward said second magnetic holder.

11. The suturing apparatus of claim 2, further comprising a needle drive actuator coupled to said tubular drive member or said first magnet holder, said needle drive actuator movable to correspondingly move said needle drive along said central tubular member.

12. The suturing apparatus of claim 1, further comprising a needle drive actuator coupled to said tubular drive member, said needle drive actuator movable to correspondingly move said needle drive along said central tubular member.

13. The suturing apparatus of any one of claim 12 or 11, further comprising a needle drive actuator slot disposed in said housing, said needle drive actuator configured to couple to a pressable needle drive actuator button disposed external to said housing, wherein forcible urging on said pressable needle drive actuator button moves said needle drive along said central tubular member.

14. The suturing apparatus of claim 1, further comprising a vacuum source fluidically coupled to said second longitudinal channel disposed in said central tubular member, said second longitudinal channel fluidically coupled to said substrate capture chamber.

\* \* \* \* \*